United States Patent

[11] 3,634,192

[72] Inventor Andre R. Brillaud
West Chester, Pa.
[21] Appl. No. 531,332
[22] Filed Mar. 3, 1966
[45] Patented Jan. 11, 1972
[73] Assignee Sun Oil Company
Philadelphia, Pa.

[54] FERMENTATION OF ANTHRACENE
10 Claims, No Drawings

[52] U.S. Cl..................................................... 195/28,
195/3 R, 195/3 H
[51] Int. Cl..................................................... C12d 1/02
[50] Field of Search............................................ 195/28, 3, 3
H

[56] References Cited
OTHER REFERENCES
Advances in Enzymology, Vol. 27, pp. 525– 526, (1965).

Primary Examiner—Lionel M. Shapiro
Attorney—W. E. McCorquodale, Jr.

ABSTRACT: Anthracene is converted to 3-hydroxy-2-naphthoic acid by the action of the micro-organism *Pseudomonas sp.* ATCC 19,286. This fermentation is preferably carried out in the presence of an anion exchange resin.

FERMENTATION OF ANTHRACENE

This invention relates to the fermentation of anthracene by means of a specific micro-organism. More particularly it relates to the conversion of anthracene to 3-hydroxy-2-naphthoic acid by microbial oxidation utilizing a particular species of the genus Pseudomonas. This micro-organism is capable of so converting anthracene while leaving phenanthrene substantially unaffected.

The oxidation product, 3-hydroxy-2-naphthoic acid, produced by fermentation of anthracene in accordance with the invention has utility as a dye intermediate and is a commercially valuable product. It is usually synthesized by the Kolbe-Schmitt carboxylation of 3-naphthol. The present invention provides an entirely different way of obtaining this product by conversion of anthracene either in relatively pure form or in admixture with phenanthrene. In the latter case the invention provides an additional benefit in that the phenanthrene can be recovered from the fermentation product in purified form. By way of comparison conventional procedures such as fractional distillation and selective crystallization are not satisfactory for obtaining phenanthrene from admixture with anthracene due, respectively, to the closeness of boiling points (both about 340° C.) and the formation of a eutectic mixture. Hence the invention can also be used for purifying phenanthrene from mixtures thereof with anthracene which purification otherwise is difficult to accomplish.

In the literature microbial oxidations of anthracene and also of phenanthrene have been described. (See "Advances in Enzymology", Vol. 27, pgs. 525–526, Interscience Publishers, 1965; Rogoff et al., *J. of Bact.*, 74, pg. 108, 1957; and Evans et al. *Biochem. J.*, 95, pg. 819, 1965.) It has been shown that the metabolic action of a few micro-organisms can produce hydroxynaphthoic acids from these micro-organisms in accordance with the following equations:

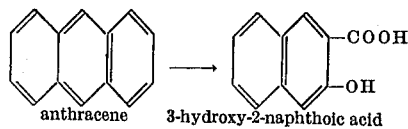
anthracene → 3-hydroxy-2-naphthoic acid

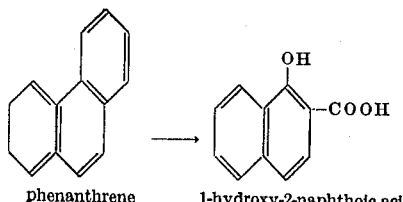
phenanthrene → 1-hydroxy-2-naphthoic acid

The micro-organisms employed, which included a Flavobacterium and *Pseudomonas aeruginosa*, show no oxidative selectivity between these tricyclic hydrocarbons but instead effect the biological oxidation of both of them. However the accumulation in either case of hydroxynaphthoic acid in amounts of practical significance has not been demonstrated.

I have now discovered a micro-organism which will biologically oxidize anthracene to produce 3-hydroxy-2-naphthoic acid without substantially attacking phenanthrene if it is present. Furthermore this micro-organism is capable of converting anthracene and causing rapid accumulation of 3-hydroxy-2-naphthoic acid in the fermentation mixture in amounts of practical significance. The specific micro-organism is a *Pseudomonas strain related to Pseudomonas geniculata*, which was isolated from hydrocarbon-contaminated soil. A culture of this organism has been deposited with the American Type Culture Collection in Washington, D. C., under the number ATCC 19,286.

The cultural and physiological characteristics identifying and distinguishing *Pseudomonas sp.* ATCC 19,286 are as follows:

Gram stain: Gram negative, short rods
Methylene Blue stain: Moderate amount of granulation
Acid fast stain: Not acid fast
Wet amount (microscopic examination): Motile
Kligler iron agar: Grey to black growth, smooth, soft
Methyl Red-Voges Proskauer medium: White stringy surface growth, Methyl Red negative no acetylmethyl carbinol produced
Sim's medium: Motile, cream colored, smooth growth, no $H_2S$, no indole production
Litmus Milk: Reduction
Nitrate Broth: Nitrite negative
Phenol Red lactose agar: Creamy white growth on surface (purple coloration of agar)
Nutrient agar: Soluble green pigment, cream colored smooth growth
Starch agar: No starch hydrolysis
Potato dextrose agar: Cream colored smooth growth
Carbohydrate tests in Phenol Red broth using 0.5 percent specific carbohydrate substrate:

| | |
|---|---|
| a) Mannitol | White stringy surface growth, no acid, no gas |
| b) Arabinose | Do. |
| c) Inositol | Do. |
| d) Saccharose | Do. |
| e) Lactose | Do. |
| f) Levulose | Do. |
| g) Dextrose | Do. |
| h) Sorbitol | Do. |
| i) Maltose | Do. |

The micro-organism ATCC 19,286 preferably is maintained on a cerelose agar medium having the following components:

| | |
|---|---|
| peptone | 10 g./l. |
| yeast extract | 5 g./l. |
| cerelose | 5 g./l. |
| $KH_2PO_4$ | 1 g./l. |
| agar | 15 g./l. |

Actually the culture when maintained for a time on this medium tends to temporarily lose its ability of rapidly attacking anthracene. However this ability can be restored by two or more serial liquid transfers of the culture at 48-hour intervals in mineral salts—anthracene medium. Such successive transfers with relatively short growth periods therebetween revive the innate ability of this micro-organism to rapidly convert anthracene to 3-hydroxy-2-naphthoic acid.

The nutrient medium for the fermentation of anthracene in accordance with the invention should contain, in addition to anthracene as a carbon and energy source, a source of available nitrogen and appropriate mineral salts. The medium should also contain suitable concentrations of yeast extract and casein hydrolysate, as the micro-organism ATCC 19,286 needs these or equivalent nutritive supplements for rapid conversion of the anthracene. Approximate optimal concentrations for these supplement components are 0.1 percent for the yeast extract and 0.04 percent for the casein hydrolysate. Increasing the concentrations of these components to substantially higher levels should be avoided, as this tends to prevent the accumulation of 3-hydroxy-2-naphthoic acid in the fermentation product although the micro-organism culture will continue to grow well.

Examples of suitable sources of nitrogen are ammonium salts such as $(NH_4)_2SO_4$ and $NH_4Cl$, or nitrate salts such as $NH_4NO_3$ and $NaNO_3$ and urea. Conventional mineral salt mixtures containing the necessary trace elements can be used and a typical mineral salt composition is as follows:

| | Grams/liter |
|---|---|
| $CaCl_2$ | 0.02 |
| $FeSO_4$ | 0.005 |
| $KH_2PO_4$ | 0.4 |
| $MgSO_4$ | 0.2 |
| $MnCl_2$ | 0.002 |
| $Na_2HPO_4$ | 0.6 |
| $NaMoO_4$ | 0.001 |
| $NH_4NO_3$ | 2.0 |

The anthracene can be added to the fermentation broth all at the beginning or in incremental amounts as the fermentation proceeds without substantial differences in the results obtained. Since anthracene has a low solubility in the aqueous medium, its concentration in the solution in the solution in contact with the cells will be quite low in any event and cannot adversely affect growth of the micro-organism regardless of the amount of excess anthracene added to the mixture. The anthracene can be in pure form or, as previously stated, can be in admixture with phenanthrene in which case the latter will not undergo biological oxidation and can be recovered in purified form from the fermentation product. The process is desirably carried out at a temperature in the range of 25° to 35° C., more preferably 28° to 32° C., under aerobic conditions with agitation. Air is preferably sparged or otherwise introduced into the broth and finely dispersed therein while the broth is being mechanically agitated. The medium should be maintained at a pH of from about 6.0 to 8.0, and preferably at about pH 7.0. For optimum yields of 3-hydroxy-2-naphthoic acid fermentation with the micro-organism is conducted for about 24 to 120 hours, and preferably for about 96 hours.

It is distinctly preferable to carry out the fermentation with the nutrient medium in contact with an anion exchange resin during the fermentation. The presence of the anion exchange resin results in accumulation of the 3-hydroxy-2-naphthoic acid at a greatly accelerated rate and in considerably higher maximum yield than otherwise obtained. The use of anion exchange resins for effecting such improvements in fermentations wherein the desired product is a carboxylic acid has been described and claimed in Humphrey et al. U.S. application Ser. No. 512,543, filed Dec. 8, 1965, now U.S. Pat. No. 3,419,469 issued Dec. 31, 1968. In practicing the present invention in this fashion either a weak anion exchange resin or a strong anion exchange resin can be employed. Various specific anion resins are commercially available and any of these which have sufficient purity can be used. These generally are composed of a styrene-divinylbenzene matrix having attached thereto basic nitrogen-containing groups which are amino groups in the case of the weakly basic exchangers and quaternary ammonium groups in the case of the strongly basic type. Preferably the weak anion exchange resins are employed for the present purpose. The resins as obtained commercially usually have hydroxyl groups as the anion associated with these nitrogen-containing groups. Prior to use in the process, the resin should be washed thoroughly with water to remove any excess basic nitrogen and any other soluble impurities, and the OH groups can be replaced by other anions, such as phosphate or chloride, by treatment of the resin with an aqueous solution containing an appropriate concentration of such other anion. While such replacement of the OH groups is not essential, it usually is advantageous. Also before use, it is generally desirable to sterilize the resin using any suitable procedure, e.g., heating to 130° C. in accordance with customary sterilization practice.

The fermentation of anthracene by means of ATCC 19,286 can be conducted in conventional manner, either batchwise or continuously, except that such anion exchange resin preferably is in contact with the broth while the fermentation reaction is proceeding. The amount of resin preferably employed will depend mainly upon its ion exchange capacity. As a general rule the amount of resin should be at least that theoretically needed for absorbing most of the 3-hydroxy-2-naphthoic acid which will be obtained. Usually commercial anion exchange resins have exchange capacities of the order of 1-2 milliequivalents of the carboxylic acid product per gram of resin and an excess of the resin over that calculated from the known exchange capacity preferably is employed. A considerable excess is not detrimental except that large excessive amounts may increase material handling and processing problems. Typical amounts of resin for use in the process usually are in the range of 20–200 grams per liter of nutrient medium. Generally it is preferable to start the fermentation reaction in the absence of the resin, allow 18–24 hours for growth of the micro-organism and thereafter add the resin.

While either a weakly basic or a strongly basic anion exchange resin can be used, it is distinctly preferable to employ a weak exchange resin, as higher yields of 3-hydroxy-2-naphthoic acid generally are obtained. After the fermentation, recovery of the product from the resin can be accomplished by contacting it with an aqueous solution of an acid such as hydrochloric, phosphoric, formic or acetic acid. In order to increase the solubility of the carboxylic acid product in the acidic displacing medium an alcohol such as methanol or ethanol can be used for preparing it. As an alternative procedure either form of anion exchange resin can be regenerated by means of caustic soda or other alkali metal hydroxide. When this is done the product is obtained in its alkali metal salt from rather than as free 3-hydroxy-2-naphthoic acid.

When the hydrocarbon substrate is a mixture of anthracene and phenanthrene, the fermentation is carried out in essentially the same way as when anthracene only is used, preferably with a weakly basic anion exchange resin present. The mixed hydrocarbons are added in the form of a fine powder which will settle less readily from the mixture than the resin. Sufficient fermentation time preferably is allowed to ensure oxidation of all of the anthracene. After the microbial oxidation of the anthracene has been completed, the broth containing suspended and dissolved phenanthrene is decanted from the resin. The broth is treated with caustic soda or other alkaline reagent to raise its pH to about 8 and convert the small amount of 3-hydroxy-2-naphthoic acid usually dissolved therein to its salt form. The alkaline broth is then treated with a suitable solvent, such as benzene, toluene, ether, chloroform, carbon tetrachloride or carbon disulfide, to extract the phenanthrene. The latter in purified form can then be recovered by evaporating the solvent.

The following examples illustrate the invention specifically:

EXAMPLE 1

This example comprises a series of comparative fermentation runs using ATCC 19,286 and various other microbial organisms for oxidation of anthracene. No ion exchange resin was used. The other micro-organisms were various cultures obtained from soil samples and grown on polynuclear aromatic substrates for purpose of isolation. Twelve cultures, selected from several hundred hydrocarbon-utilizing micro-organisms isolated from a multitude of soil samples, were obtained in this manner for comparison with ATCC 19,286, and each was capable of growing on anthracene as the sole carbon source. They were all microbial but not otherwise identified for classification.

A series of runs was carried out with the various anthracene-consuming micro-organisms in 300 ml. shake flasks at 30° C. using 100 ml. of the mineral salts solutions described above. Agitation was effected by means of a gyratory shaker at 250 r.p.m. Neither yeast extract nor casein hydrolysate was present in any of these runs. At the start of each one gram of anthracene was added and the medium was inoculated with 1 percent by volume of a vegetative inoculum of the particular culture to be tested. The initial pH value of the medium in each run was about 7, and the pH decreased somewhat as the fermentations proceeded. After maximum yields of carboxylic acid product were reached and the fermentation ceased, the mixture was made more strongly acidic by addition of hydrochloric acid and the product was extracted therefrom with ether. Analysis of product was done by paper chromatography and ultraviolet spectroscopy.

Results from these runs showed that all of the micro-organisms produced 3-hydroxy-2-naphthoic acid as essentially the only accumulated product, that the 12 micro-organisms other than ATCC 19,286 each required 6–8 days to reach maximum yield and that such maximum yield in each of the 12 cases was about 0.7–0.8 gram per liter. In comparison ATCC 19,286 required only one day to reach its maximum yield which, under these conditions, was approximately 1.0 gram per liter. This indicates that ATCC 19,286 is considerably more effective in achieving rapid conversion of anthracene to 3-hydroxy-2-naphthoic acid than any of the other anthracene-consuming micro-organisms.

EXAMPLE 2

Three duplicate shake flask runs were made using ATCC 19,286 in each and in substantially the same way as described in the preceding example. However, after about 24 hours when the concentration of 3-hydroxy-2-naphthoic acid had reached about one g./l., approximately 6 g. of a weakly basic anion exchange resin in the chloride form were added in each run. The resin had previously been purified and sterilized. After addition of the resin the fermentations were continued until approximately maximum accumulation of the product had occurred as judged by appearance of the resin (no further darkening). This required 5–6 days. The product was then worked up and analyzed. This was done by decanting the broth from the resin, filtering the cells from the broth, and recovering the carboxylic acid from the broth and from the resin in the form of methanol solutions. The filtered broth was acidified with HCl and extracted with ethyl ether, the ether was evaporated, the residue was dissolved in methanol and the resulting solution was analyzed by ultraviolet spectroscopy. The resin was treated with a 5% HCl solution in methanol to displace the products therefrom and the methanolic product solution was analyzed in similar fashion. Most of the 3-hydroxy-2-naphthoic acid formed was present in the resin. Results for the three duplicate runs were as follows:

| | Fermentation Time | Yield of 3-hydroxy-2-naphthoic acid | |
|---|---|---|---|
| | | Total g./l. | Daily avg., g./l. |
| Run A | 6 days | 20 | 3.3 |
| Run B | 5 days | 23 | 4.6 |
| Run C | 5 days | 24 | 4.8 |

These results indicate that *Pseudomonas sp.* ATCC 19,286 is capable of producing 3-hydroxy-2-naphthoic acid from anthracene at rates and in yields far greater than heretofore experienced with any other micro-organism.

EXAMPLE 3

Another shake flask run was carried out using ATCC 19,286 and weakly basic exchange resin under substantially the same condition as for example 2, except that the hydrocarbon substrate was a mixture of equal parts (1 g. each) of anthracene and phenanthrene. Fermentation was allowed to proceed for 4 days and the product was then worked up and analyzed. The analysis showed that only the anthracene had been attacked by the micro-organism, that 3-hydroxy-2-naphthoic acid was obtained in a total yield of 12 g./l. and that no detectable amount of 1-hydroxy-2-naphthoic acid had been formed. The phenanthrene was recoverable substantially quantitatively from the fermentation mixture by the procedure hereinbefore described.

I claim:

1. Method of preparing 3-hydroxy-2-naphthoic acid which comprises subjecting anthracene to action of the micro-organism *Pseudomonas sp.* ATCC 19,286 in an aqueous nutrient medium under aerobic fermentation conditions.

2. Method according to claim 1 wherein said nutrient medium is in contact with an anion exchange resin during the fermentation.

3. Method according to claim 3 wherein said resin is a weakly basic anion exchange resin.

4. Method according to claim 1 wherein said nutrient medium contains yeast extract and casein hydrolysate in nutritive supplement amounts.

5. Method according to claim 2 wherein said nutrient medium contains yeast extract and casein hydrolysate in nutritive supplement amounts.

6. Method according to claim 3 wherein said nutrient medium contains yeast extract and casein hydrolysate in nutritive supplement amounts.

7. Method according to claim 1 wherein a mixture of anthracene and phenanthrene is used in the fermentation and phenanthrene of improved purity is recovered from the fermentation product.

8. Method according to claim 7 wherein said nutrient medium is in contact with an anion exchange resin during the fermentation.

9. Method according to claim 8 wherein said resin is a weakly basic anion exchange resin.

10. Method according to claim 9 wherein said nutrient medium contains yeast extract and casein hydrolysate in nutritive supplement amounts.

* * * * *